United States Patent [19]

Muller

[11] 4,230,328
[45] Oct. 28, 1980

[54] DEVICE FOR CONNECTING AN EJECTION PIN OF AN INJECTION MOLDING TOOL OR THE LIKE TO AN EJECTOR DEVICE

[76] Inventor: Hans K. Muller, 12 5:e Villagatan, 502 44 Boras, Sweden

[21] Appl. No.: 954,724

[22] Filed: Oct. 25, 1978

[30] Foreign Application Priority Data

Apr. 27, 1978 [SE] Sweden .............................. 7804845

[51] Int. Cl.³ ............................................ B23B 31/16
[52] U.S. Cl. .................................... 279/71; 279/1 E; 279/1 SG
[58] Field of Search ............... 279/71, 66, 17, 7, 1 SG, 279/1 E

[56] References Cited

U.S. PATENT DOCUMENTS

| | | | |
|---|---|---|---|
| 351,871 | 11/1886 | Lampert | 279/71 X |
| 1,807,265 | 5/1931 | Walker | 279/7 X |
| 2,140,303 | 12/1938 | Swanson | 279/71 |

*Primary Examiner*—Gil Weidenfeld
*Attorney, Agent, or Firm*—William Drucker

[57] ABSTRACT

A device to connect an ejector device, of an injection molding machine, to an ejector pin of a mold used with the machine. The device has a holder with jaws which are radially movable therein for clamping and unclamping the ejector pin introduced into the holder. A spring urges the jaws towards the clamping position, and the jaws can be moved to the unclamping position by a manually operable actuator. A latch can hold the jaws in the unclamped position, and the holder has a releasing element mounted in it and arranged so that when actuated by the ejector pin it allows the spring to bring the jaws into the clamping position to lock the ejector pin.

5 Claims, 8 Drawing Figures

DEVICE FOR CONNECTING AN EJECTION PIN OF AN INJECTION MOLDING TOOL OR THE LIKE TO AN EJECTOR DEVICE

BACKGROUND OF THE INVENTION

Field of the Invention

This invention relates to a device for connecting an ejector pin of an injection molding tool or the like to an ejector device.

The devices of the kind referred to which are hitherto used are objectionable in that the connection has to be manually performed and the connection has to be carried out in a narrow space owing to the fact that the mold parts have to be brought together by the machine before such a connection can take place. Serious accidents have occurred when the ejector device has been unintentionally operated during such work and accidents have also been reported which are due to the narrow spaces in which the hands of the operator have to operate. Further, it is often difficult to effect said connection with the known devices in such a manner that misalignment between ejector pin and connecting device does not negatively affect the ejecting effect and cause unacceptable wear of the tool.

BRIEF SUMMARY OF THE INVENTION

It is therefore the primary object of this invention to improve such devices such that the connection takes place automatically when the ejector device and the ejector pin are moved into engagement with each other.

It is a further object of this invention to provide a simple and compact device that only needs to be manually pre-tensioned—which may be performed when the ejector pin and the ejector device are totally separated from each other or even before the tool is applied to the machine—while the connecting step is automatically performed when the ejector device and the ejector pin are moved into engagement with each other.

BRIEF DESCRIPTION OF THE DRAWINGS

The accompanying drawings, which are incorporated in and constitute a part of this specification illustrate one embodiment of the invention and, together with a description, serve to explain the principles of the invention.

Of the drawings

DETAILED DESCRIPTION OF THE PREFERRED EMBODIMENTS

Figure 1:
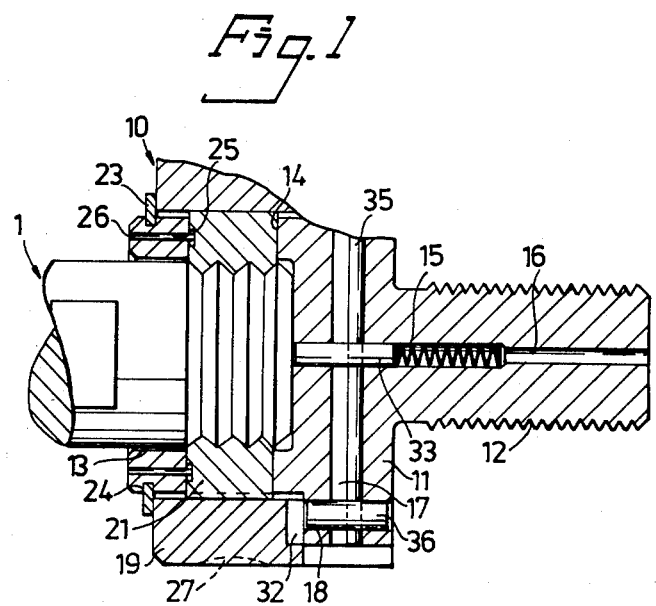
FIG. 1 is a sectional view through the device in a connecting position.

In the drawings, reference numeral 1 generally indicates an ejector pin of an injection molding tool or the like. The actual connecting device is generally designated by numeral 10 and is shaped as a chuck provided with radially movable jaws.

Generally, the connecting device is to be connected to the ejector device to operate the ejector pin of the tool but nothing prevents the connecting device from rather being connected to the ejector pin, whereby the ejector device has an ejector bar of principally the same shape as the ejector pin 1. In the following description, this less practical alternative will not be described.

In the illustrated embodiment the connecting device includes a body member 11, which has a preferably threaded connecting member 12, by means of which the connecting device may be fixedly fastened to the movable part of the ejector device. The body member 11 has a first axial bore 13 of a somewhat larger diameter than that of the ejector pin 1. In the tubular portion of the body member 11 so formed a number of non-cylindrical transverse holes 14 are provided. Said holes serve as a guiding means for jaws displaceably mounted in a radial direction. A narrower bore 15 coaxial with the bore 13 merges into an even narrower through bore 16.

A through bore 17 extends perpendicular to the bore 15 for a purpose to be described.

A flange is defined between said tubular portion of the body member and the connecting member 12 thereof and said flange is provided with two through holes 18.

An adjustable ring 19 is rotatably mounted around the tubular portion of the body member 11. As may be seen in FIG. 6, the adjustable ring has in its inner surface a number of recesses 20, which define internal cams, intended to operate the jaws 21 for the displacement thereof in the radial direction. As previously mentioned, the jaws are inserted into the holes 14 of rectangular or square section and naturally, the jaws have a corresponding shape so that they may be displaced in the radial direction but not turned. In the end of the jaws facing the centre of chuck said jaws have cuts 22, for example shaped as grooves with a triangular profile.

A locking ring 23 is inserted into a groove 24 in the body member in order to secure the adjustable ring 19 against movement in the axial direction.

As previously mentioned, the jaws 21 are intended to be displaced towards the centre of the chuck and away from said centre, respectively. Since the jaws have small heights in relation to the bore 13, they would not remain in said bores 14 thereof if special precautions were not taken to prevent them from leaving said bores 14. For this purpose, one end surface of the jaws has a recess 25 and passing through the front wall of the body member 11 these recesses engage small pins 26.

In order to facilitate the turning of the adjustable ring said ring preferably has recesses 27 in the envelope surface thereof.

Figure 8:
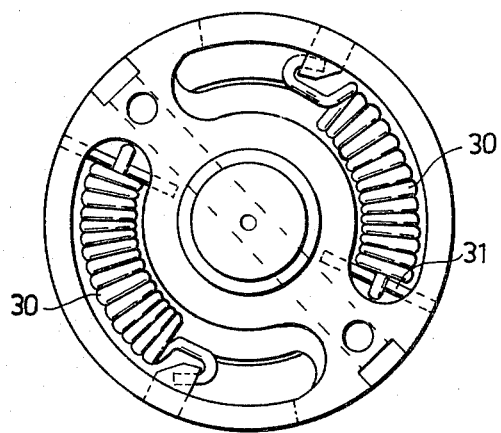
FIG. 8 is an end view according to FIG. 4 but with inserted springs and an adjustable ring indicated in dotted lines.

Further, the adjustable ring 19 has two axially extending projections 28, each having a hole 29 into which one end of a spring 30 may be hooked. The opposite end of the spring is, as seen in FIG. 8, hooked over a pin 31 driven into the body member 11 and it is understood, that the adjustable ring 19 will be maintained in the position illustrated in FIG. 8 by said springs. In this position, the other components of the connecting device are in the operative position shown in FIG. 1. However, it is understood that the adjustable ring may be rotated in the anti-clockwise direction according to FIG. 8 to overcome the force of the spring.

Figure 6:
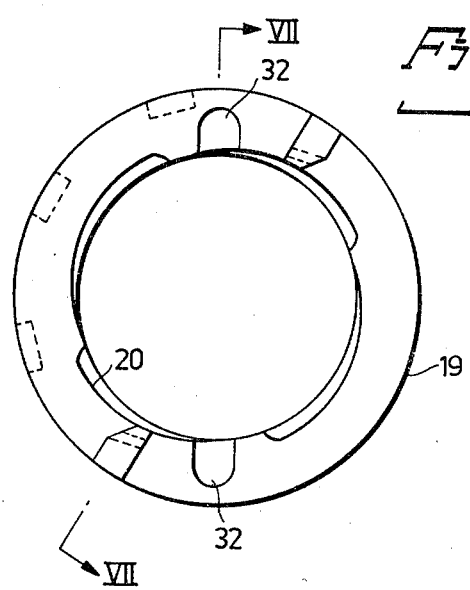
FIG. 6 is an end view of an adjustable ring forming part of the device.
Figure 7:
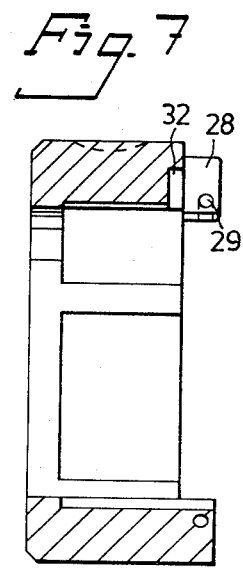
FIG. 7 is a sectional view through the adjustable ring according to FIG. 6.

The adjustable ring 19 has two recesses 32 in one end surface thereof according to FIG. 8 (see also FIG. 6). Said recesses are located diametrically opposite to each other.

Figure 2:
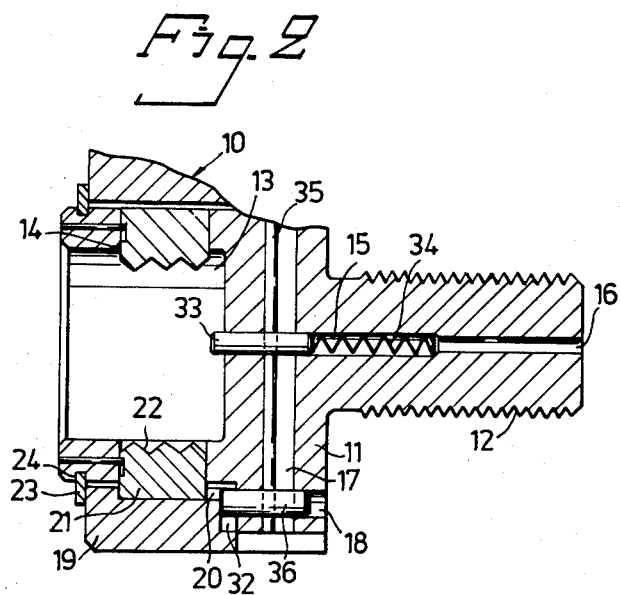
FIG. 2 is a similar sectional view through the device which is in a position ready for the connecting step.
Figure 3:
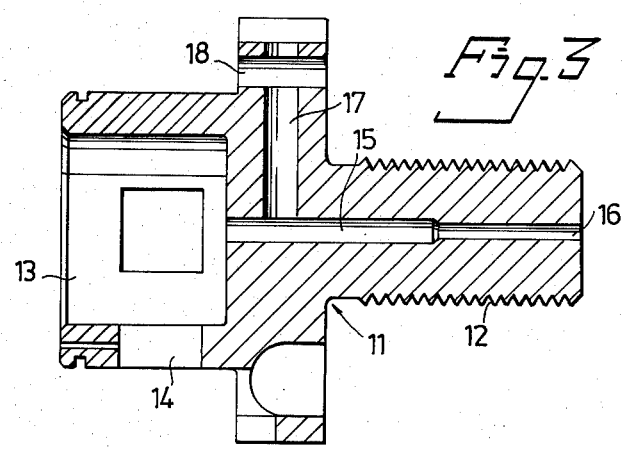
FIG. 3 is a sectional view through a body member of the device.

A cylindrical pin 33 is displaceably mounted in the bore 15 of the body member 11, and acts against a helical spring 34 provided in said bore, said spring having such a length and strength that it normally resiliently holds the pin 33 in a position defined by a pin 35 passing through the pin 33 in the transverse direction thereof and engaging the wall of the transverse bore 17 of the body member as illustrated in FIG. 2.

The pin 35 in its turn passes through two outer cylindrical pins 36 in the transverse direction. Said cylindrical pins are guided in the holes 18 of the body member and, as may be seen in FIG. 2, said pins may in a definite angular position of the adjustable ring engage the recesses 32 thereof.

The device just described operates in the following manner:

By turning the adjustable ring from the position shown in FIGS. 1 and 8 in an anti-clockwise direction according to FIG. 8 the recesses 32 of the adjustable ring 19 are brought into register with the outer pins 36. Spring 15 will thereby displace the cylindrical pin 33 to the left in FIG. 1 until pin 35 engages the left wall surface of the hole 17. Naturally, at the same time, the outer pins 36 have been pressed into the recesses 32 of the adjustable ring 19 and it is understood that hereby, the adjustable ring is catched in the actual angular position. The adjustable ring is in other words pre-tensioned since the springs 30 tend to bring said adjustable ring back to the initial position thereof. By this manual step, the connecting device has been brought to a ready-for-action position.

When the ejector device is made operative so that the connecting device is brought into engagement with the ejector pin 1 of the tool the ejector pin will enter the bore 13. As may be seen in FIG. 1 the ejector pin 1 has a number of ridges 37 of the same profile as the grooves in 22 in the jaws. The jaws 21 are—within the limits defined by the recesses 25 and the pins 26—freely movable in the guidings thereof. Therefore, the jaws will be displaced in a direction away from the centre of the connecting device when the ejector pin enter the bore 13 such that the entrance of the ejector pin 1 in the bore 13 is not prevented by said jaws. Thereby, the ejector pin will be able to engage the cylindrical pin 33 which, against the action of the spring, will be displaced to the right in FIG. 2 to the position of FIG. 1.

By said displacement, naturally, the outer pins 36 will also be displaced to the right by means of pin 35. When pin 33 has been displaced such a distance that the outer pins 36 leave the engagement with the recesses 32 of the adjustable ring, the springs 30 turn the adjustable ring in a clock-wise direction so that said ring returns to the initial position thereof. By the turning step, the internal cams 20 of the adjustable ring have brought the jaws to the gripping position illustrated in FIG. 1 in which they grip the ejector bar. Since the jaws and the ejector pin has parts 22, 37 engaging each other a very efficient locking action is obtained, despite the relatively weak force of the spring between the ejector pin and the connecting device and the desired connecting action is thereby obtained.

Since the adjustable ring may be tensioned when the mould and the ejector device are totally separated from each other, this manual operation may be performed without any hazard for the operator. Thereafter, the actual connecting step is performed totally automatically by bringing the ejector device into operation and in said connecting step no manual steps are required.

The described device does not need a highly accurate centering of the ejector device and ejector pin, since the parts may be shaped with a certain degree of clearence without thereby risking the efficiency of the connection.

Figure 4:
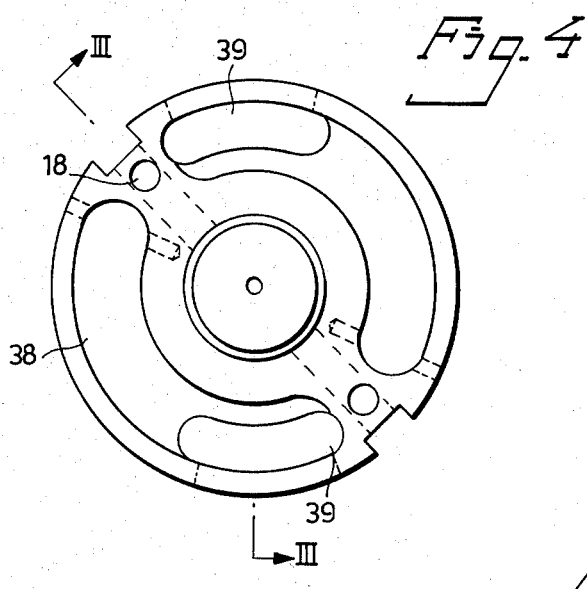
FIG. 4 is an end view of the body member of FIG. 3 seen from the right in the drawing.
Figure 5:
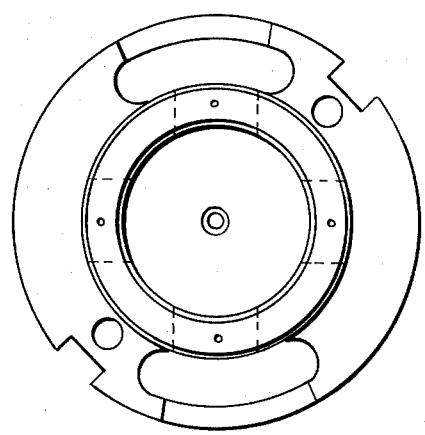
FIG. 5 is an end view of the body member of FIG. 3, seen from the left in the drawing.

FIG. 4 illustrates how the grooves and the recesses 38 and 39 for the springs preferably may be shaped. Hereby, the springs are accomodated in the main body and it is understood that the connecting device hereby and by virtue of the rest of the design may have very small dimensions so that it may suitably be applicable to all types of ejector devices.

I claim:

1. A device to connect (a) an ejector pin of a mold for injection molding, and (b) an ejector device of an injection molding machine, comprising in combination:
   (i) a holding means having jaws radially movable therein for clamping and unclamping said ejector pin,
   (ii) manually operable actuation means for moving said jaws at least to the unclamping position thereof,
   (iii) at least one spring acting to urge said jaws towards the clamping position thereof,
   (iv) a latching means to hold said jaws in the unclamping position thereof, and
   (v) a release means mounted in said holding means to cooperate with said ejector pin such that when actuated by said ejector pin said latching means will allow said springs to bring said jaws into the clamping position thereof to lock said ejector pin.

2. A device as claimed in claim 1 wherein said ejector pin and said jaws have inter-engageable grooves and ridges to secure said pin and jaws against axial displacement to each other when said pin and jaws are in the interengaging clamping position.

3. A device, as claimed in claim 1, wherein said manually operable actuating means is mounted for rotation in said holding means with a radial clearance relative to said holding means, a radial clearance being also present between said ejector pin and a bore in the holding means into which said ejector pin may enter, in order to equalize any misalignment between said holding means and said ejector pin.

4. A device, as claimed in claim 1, wherein said manually operable actuating means has internal cam surfaces abutted by said jaws to clamping position upon turning said actuating means in one direction, said actuating means being actuated by springs urging said actuating means in said direction, and wherein releasable means are provided to hold said actuating means in an angular position in which said springs are tensioned.

5. A device, as claimed in claim 4 wherein said actuating means has at least one recess into which said spring-biased latching means snap, when said actuating means has been moved against the action of said springs to a ready-for-action position in which said springs are tensioned and in which position said jaws are free to perform a limited movement thereby permitting said ejector pin to enter said holding means, said latching means being connected to a pin which is displaceably mounted in said holding means and engages said ejector pin when said ejector pin has entered said holding means.

* * * * *